US008078427B2

(12) United States Patent
Tischler et al.

(10) Patent No.: US 8,078,427 B2

(45) Date of Patent: Dec. 13, 2011

(54) CALIBRATION CURVE FIT METHOD AND APPARATUS

(75) Inventors: Marc Tischler, Mountain View, CA (US); Vadim Kalmeyer, Menlo Park, CA (US)

(73) Assignee: Agilent Technologies, Inc., Santa Clara, CA (US)

( * ) Notice: Subject to any disclaimer, the term of this patent is extended or adjusted under 35 U.S.C. 154(b) by 189 days.

(21) Appl. No.: 11/465,990

(22) Filed: Aug. 21, 2006

(65) Prior Publication Data

US 2008/0077351 A1 Mar. 27, 2008

(51) Int. Cl.
*G06F 17/18* (2006.01)

(52) U.S. Cl. ........... 702/179; 702/23; 702/127; 702/189

(58) Field of Classification Search .................... 702/22, 702/23, 30, 85, 90, 137, 179, 183, 189; 250/252.1, 250/181, 287, 339.09, 341.5, 363.09, 559.1; 356/451
See application file for complete search history.

(56) References Cited

U.S. PATENT DOCUMENTS

| | | | | |
|---|---|---|---|---|
| 5,043,928 | A * | 8/1991 | Odencrantz et al. | 356/319 |
| 5,793,380 | A * | 8/1998 | Matsuno | 345/443 |
| 7,243,030 | B2 * | 7/2007 | Reeve et al. | 702/19 |
| 7,324,924 | B2 * | 1/2008 | Barajas et al. | 702/189 |
| 2004/0102906 | A1 * | 5/2004 | Roder | 702/22 |
| 2005/0080578 | A1 * | 4/2005 | Klee | 702/85 |
| 2005/0230616 | A1 * | 10/2005 | Cameron et al. | 250/287 |
| 2006/0293861 | A1 * | 12/2006 | Askenazi | 702/22 |
| 2007/0179753 | A1 * | 8/2007 | Barajas et al. | 702/189 |
| 2007/0248494 | A1 * | 10/2007 | Mokelke et al. | 422/82.08 |

FOREIGN PATENT DOCUMENTS

| | | |
|---|---|---|
| GB | 2 491 721 | 4/2004 |
| JP | 3142358 | 6/1991 |

OTHER PUBLICATIONS

OriginLab Corporation, Origin Help, 2000, Origin Lab Corporation, Version 7, pp. 509-594.*
Walsh, S. and Diamond, D., Non-Linear Curve Fitting Using Microsoft Excel Solver, 1995, Talanta, vol. 42 No. 4, p. 561-572.*
GB Search Report dated Dec. 19, 2007, mailed Dec. 20, 2007, for GB Application No. 0716172.2. filed Aug. 17, 2007, corresponding to U.S. Appl. No. 11/465,990.

* cited by examiner

*Primary Examiner* — Drew A Dunn
*Assistant Examiner* — Mischita Henson

(57) ABSTRACT

A data analysis method includes automatically generating a set of curve fits for a data set from a mass spectrometer. The set of curve fits includes a plurality of suggested curve fits, each associated with a curve fit equation type. For each suggested curve fit, a fit metric is generated that indicates how well the curve fit matches the data set. Thereafter, a user interface is displayed that includes a table of user selectable suggested curve fits for display. A default suggested curve fit having a highest fit metric is displayed. A user override selection may be received for displaying at least one of the suggested curve fits in the table. The set of suggested curve fits under consideration can be filtered to conform with user requirements.

25 Claims, 6 Drawing Sheets

625a 670 625b 670 625c 670 625d 670 625e 670 625f 670 625g 670 625h 670

CurveFit

| | Type ▿ | Origin ▿ | Weight▿ | #of Disabled Points▿ | R2 ▿ | Standard error▿ | Max%Residual ▿ | Equation ▿ |
|---|---|---|---|---|---|---|---|---|
| ▶ | Second Order In | Ignore | None | 3 | 0.99971191 | 0.8 | 3.3 | In (y)=0.4236+0.9803"In(x)+9.9604E-004"In(x)^2 |
| | Power | Ignore | None | 3 | 0.99971192 | 0.7 | 3.4 | y = 1.5059" x ^ 0.9880 |
| | Power | Force | None | 3 | 0.99971192 | 0.7 | 3.4 | y = 1.5059" x ^ 0.9880 |
| | Quadratic | Ignore | None | 3 | 0.99970563 | 0.8 | 3.4 | y = -2.6989E-004 " x ^ 2 + 1.4521" x 0.0089 |
| | Quadratic | Ignore | None | 3 | 0.99970311 | 0.8 | 3.4 | y = -2.7006E-004 " x ^ 2 + 1.4521" x 0.0093 |
| | Quadratic | Force | None | 3 | 0.99970308 | 0.8 | 3.4 | y = -2.6622E-004 " x ^ 2 + 1.4516" x |
| | Linear | Ignore | None | 3 | 0.99968251 | 0.8 | 3.4 | y = 1.4267 " x + 0.0824 |
| | Linear | Ignore | None | 3 | 0.99967991 | 0.8 | 3.4 | y = 1.4267 " x + 0.0857 |
| | Linear | Force | None | 3 | 0.99967670 | 0.8 | 3.4 | y = 1.4279 " x |
| | Second Order In | Ignore | Log | 3 | 0.99967327 | 1.0 | 3.4 | In (y) = 0.4623 + 0.9598 " In(x) + 0.0036" In(x)^2 |
| | Power | Ignore | Log | 3 | 0.99967099 | 1.0 | 3.4 | y = 1.5053 " x ^ 0.9881 |
| | Power | Force | Log | 3 | 0.99967099 | 1.0 | 3.4 | y = 1.5053 " x ^ 0.9881 |
| | Quadratic | Ignore | Log | 3 | 0.99967038 | 1.0 | 3.4 | y = -2.4005E-004 " x ^ 2 + 1.4487" x +0.0337 |
| | Quadratic | Force | Log | 3 | 0.99964038 | 1.0 | 3.4 | y = -2.5290E-004 " x ^ 2 + 1.4503" x |
| | Linear | Ignore | Log | 3 | 0.99964256 | 1.0 | 3.4 | y = 1.4249 " x + 0.1935 |
| | Linear | Force | Log | 3 | 0.99963355 | 1.0 | 3.4 | y = 1.4275 " x |

39 Samples (39 Total) X3.54 Y 0.125

620

600

*Fig. 3 continued*

CALIBRATION CURVE FIT METHOD AND APPARATUS

BACKGROUND OF THE INVENTION

The present invention generally relates to data analysis systems and methods. More particularly, the present invention relates to curve fitting systems, methods and apparatus for mass spectroscopy systems.

Numerous computing systems use data analysis systems to automatically analyze data to simplify a user's job. Traditional data analysis systems for mass spectroscopy systems typically provide limited analysis of data and provided limited user selection of data analysis options. Mass spectroscopy systems, for example, often include data analysis systems for fitting a line or a curve to a set of data. However, these traditional data analysis systems typically leave large amounts of analysis for the user to perform. These large amounts of analysis cost the user relatively large amounts of time, and in turn increase the monetary cost of data analysis.

New data analysis systems for mass spectroscopy systems and the like are needed that provide user selectable data analysis options.

BRIEF SUMMARY OF THE INVENTION

The present invention provides a data analysis system. More particularly, the present invention provides curve fit systems, apparatus and methods for a mass spectroscopy system.

According to one embodiment of the present invention, a computerized data analysis method for a spectroscopy system is provided. According to one aspect, a computer-implemented method is provided for processing data from a mass spectrometer system. The method typically includes processing a response data set against a concentration data set to produce a process result, fitting the process result to a set of established statistical parameters to produce a graphical result and parameters, displaying the graphical result and parameters for further flexible processing, and allowing a user to select one or more of said parameters for further processing. Established statistical parameters include one or more fit equations and associated parameters of the equation(s). The graphical result (and parameters) includes an active curve fit (and parameters) to which the data points have been fitted and/or a plurality of suggested curve fits and associated parameters.

In certain aspects, the method typically includes automatically generating a set of suggested curve fits for a data set produced by a mass spectrometer or other spectroscopy system. In certain aspects, the curve fits are automatically generated prior to receiving a user request for a curve fit to the data set. The suggested curve fits are each associated with a curve fit equation type. Curve fit equation types include linear equations, quadratic equations, power equations, first and second order log equations, exponential equations, average of response factors equations and others. In certain aspects, at least one of the suggested curve fits has zero, one or more outlier points removed from the data set. For each curve fit, a fit metric is generated that indicates how well the curve fit matches the data set. A user interface is displayed on a display that includes a table with one or more of the suggested curve fits and parameters. A default suggested curve fit is displayed, wherein the default curve fit has a highest or best fit metric for the suggested curve fits displayed in the table. A user may select from among any of the suggested curve fits listed and the system will display the selected suggested curve fit on the fly.

According to one aspect, at least one of the suggested curve fits has 0, 1, 2 or 3 outliers removed from the data set. In another aspect, at least one suggested curve fit is weighted by a weighting factor included in a set of weighing factors, wherein the set of weighting factors includes one or more of 1, $1/x$, $1/x^2$, $1/y$, $1/y^2$, and $\log(x)$. In one aspect, the suggested curve fits include one or more of a curve fit that is forced through the origin, a curve fit that includes the origin, or a curve fit that ignores the origin.

According to another aspect, the set of user selections in a display includes one or more of a selection option for a curve fit equation, a selection option for a number of outliers removed from the data set, a selection option for a weighting factor, a selection option for origin handling. The selection option for the curve fit equation type in a display includes one or more of a linear equation, a quadratic equation, a power equation, a first-order log equation, a second-order log equation, and an average of response factors equation. In one aspect, the selection option for the number of outliers removed from the data set in a display includes zero, one, two, and three. In certain aspects, the selection option for the weighting factor includes 1, $1/x$, $1/x^2$, $1/y$, $1/y^2$, and $\log(x)$. In certain aspects, the selection option for origin handling includes forcing the curve fit through the origin, the curve fit includes the origin, and the curve fit ignores the origin.

According to another aspect of the present invention, a mass spectroscopy system is provided that includes a mass spectrometer configured to generate a data set for a sample; and a computer system configured to implement or execute the curve fit generation processing methods described herein.

Reference to the remaining portions of the specification, including the drawings and claims, will realize other features and advantages of the present invention. Further features and advantages of the present invention, as well as the structure and operation of various embodiments of the present invention, are described in detail below with respect to the accompanying drawings. In the drawings, like reference numbers indicate identical or functionally similar elements.

DETAILED DESCRIPTION OF EXEMPLARY EMBODIMENTS

Figure 1:
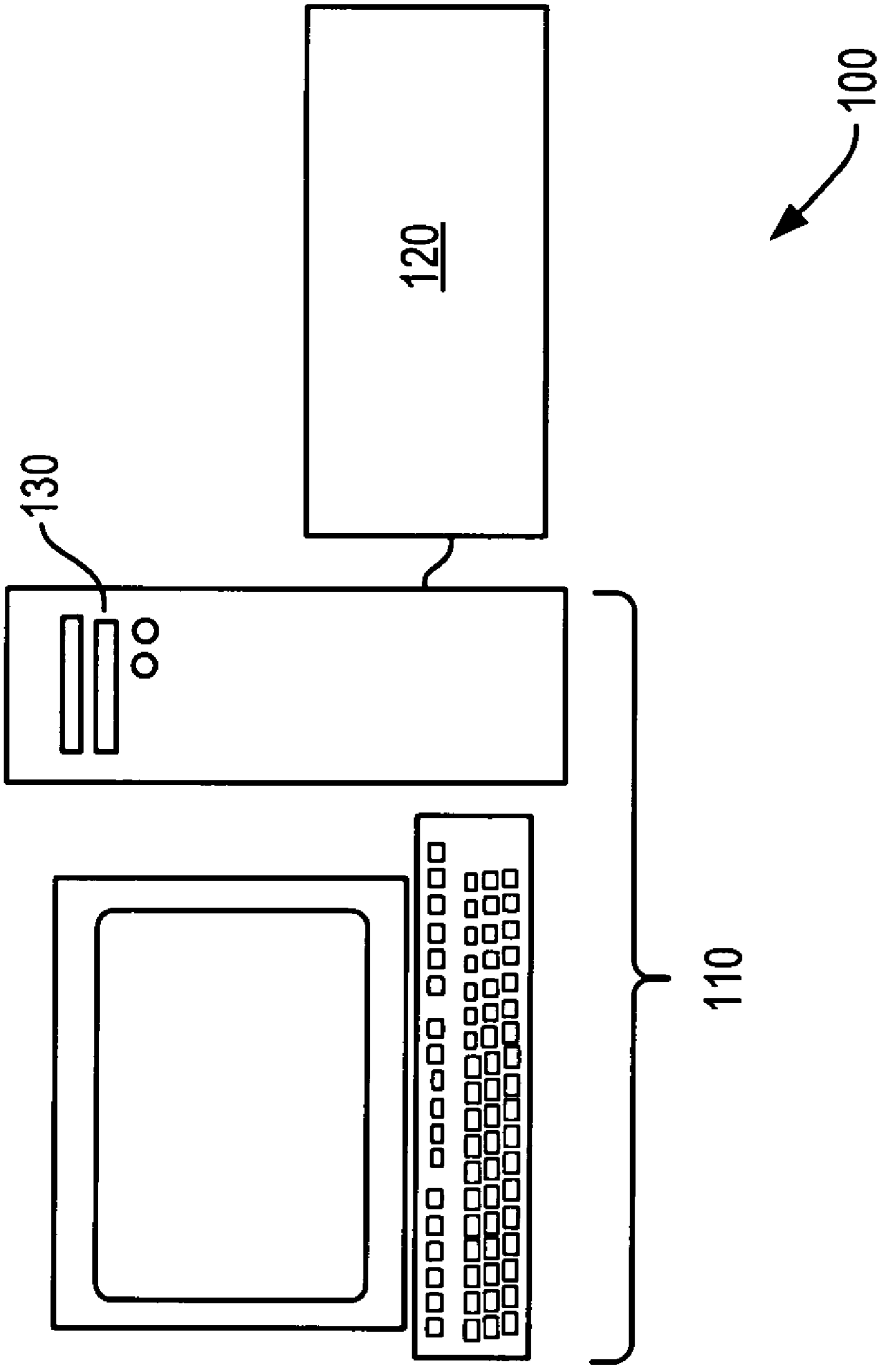
FIG. 1 is a simplified schematic of a mass spectroscopy system according to an embodiment of the present invention.

FIG. 1 is a simplified schematic of a system 100 according to an embodiment of the present invention. System 100 includes a computer system 110 configured to receive data from a data generation system 120, which may be a mass spectrometer or the like. The computer system (and/or the data-generation system) may include a device configured to read data and code stored on a computer readable medium 130 that stores various computer code embodiments of the present invention, such as a hard disk drive. Computer system 110 may be configured to run the computer code to execute various embodiment of the present invention. While the computer system and the data generation system are shown as discrete systems, these systems may be an integrated system. For example, computer system 110 may include a processor coupled with or resident in a mass spectrometer system or it may include a processor resident in a stand-alone computer system.

Figure 2:
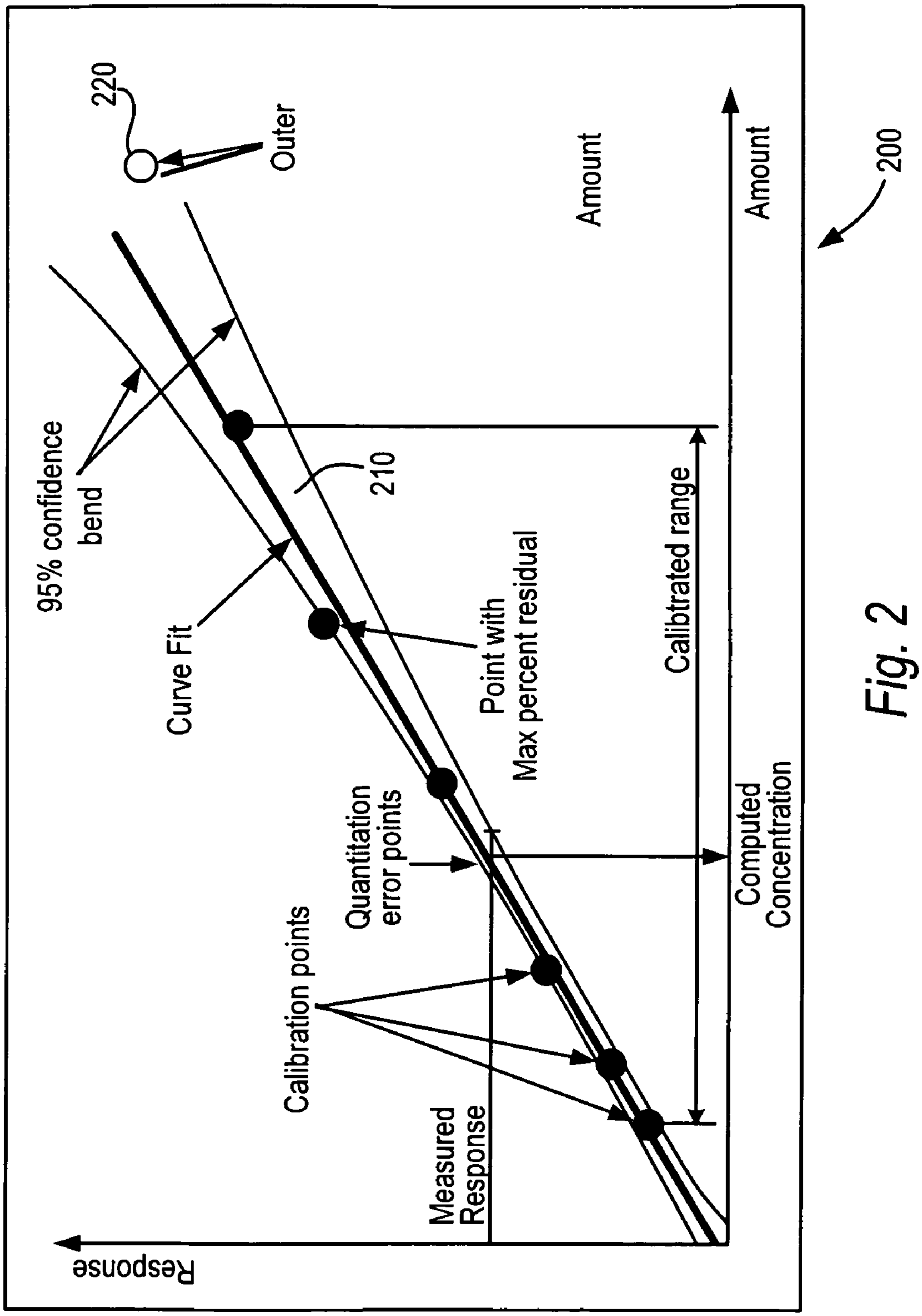
FIG. 2 is a graph of data that might be generated by the mass spectroscopy system.

FIG. 2 is a graph 200 of data that might be generated by the data generation system and rendered on a display by the computer system. The data might represent mass spectroscopy data for a sample. The vertical axis may represent the response of the mass spectrometer, and the horizontal axis may represent the amount of the chemical compound or material. The data points of the graph may be fit to one or more curves by computer code operative on the computer system according to an embodiment of the present invention. Line 210 is an example line that may be curve fit to the data by the computer code.

According to one embodiment, the computer code is configured to fit a plurality of lines or curves to the data generated by the data generation system. As used herein, "curve fitting" or "curve fit operation" or "generating a curve fit" generally refers to a process of finding or determining a curve which matches a series of data points (data set) and possibly other constraints. Curve fitting might include interpolation (where an exact fit to the data set and constraints is expected) and curve fitting/regression analysis (where an approximate fit to the data set is permitted). A resulting curve fit is defined by a curve fit equation and a set of determined parameters. For example, the computer system or a separate processor resident in the data generation system may be configured to fit data generated by the data generation system by performing a linear fit, a quadratic fit, a power fit, a first-order log fit, a second-order log fit, and/or an average of response factors fit. The foregoing curve fit operations may generally be represented by the following equations:

linear: $y=ax+b$, quadratic: $y=ax^2+bx+c$, power: $y=ax^b$, first-order log: $y=a\ln(x)+b$, second-order log: $\ln(y)=a\ln^2(x)+b\ln(x)+c$, and average of response factors $y=ax$.

For each curve fit, "y" represents the response of the mass spectrometer, and "x" represents the concentration, or amount of material present in the sample. The parameters of the equations to be determined in the curve fit include "a," "b," and "c." It should be appreciated that other curve fit equations may be used.

According to one embodiment, for each curve fit of the data to the forgoing equations, the computer code i) forces the fit to go through the origin (0,0), ii) includes the origin in the data generated by the data generation system, and/or iii) curve fits the data without forcing the curve fit to pass through the origin and without adding the origin as a data point. For example, in one aspect, for a linear curve fit, a first linear curve fit operation is performed that forces the curve fit through the origin, a second linear curve fit operation is performed that includes the origin as a data point, and a third curve fit operation is performed that does not force the curve fit through the origin and does not include the origin as a data point (i.e., the origin is ignored). That is, three linear equations (e.g., $y=a_1x+b_1$, $y=a_2x+b_2$, $y=a_3x+b_3$) are generated that fit the data produced by the data generation system.

For each curve fit generated by the computer code, in one aspect, the computer code is configured to weight the curve fits. For example, each curve fit may be weighted by a weighting factor of 1, 1/x, $1/x^2$, 1/y, $1/y^2$, and/or log(x). For example, for a curve fit for a linear equation for which the origin is ignored, six linear equations that fit the data may be generated with each of the six linear equations having a unique weighting factor (e.g., no weighting factor (or 1), 1/x, $1/x^2$, 1/y, $1/y^2$, and log(x)). According to a further example, for a linear equation for which the curve fit is forced through the origin, six linear equations that fit the data may be generated with each of the six linear equations having a unique weighting factor (e.g., no weighting factor, 1/x, $1/x^2$, 1/y, $1/y^2$, and log(x)). According to a further example, for a linear equation fit for which the origin is included in the data curve fit, five linear equations that fit the data may be generated with each of the five linear equations having a unique weighting factor (e.g., no weighting factor, 1/x, $1/x^2$, 1/y, and $1/y^2$). The log(x) weighting factor is not valid with the data fit to the origin.

Table 1 below shows the weighting factors that are generally valid and invalid for each of the curve fit equations presented above. In the column "Valid Model", a "1" indicates that the weight factor cannot be evaluated at the origin point x=0; a "2" indicates that the regression algorithm cannot evaluate the fit function at the origin; and a "3" indicates that the regression algorithm cannot evaluate the derivative of the fit function at the origin.

TABLE 1

| Curve Fit EquationType | Origin Type | Weight Type | Valid Model | Curve Fit Equation |
|---|---|---|---|---|
| Linear | Ignore | Any | Yes | $y = ax + b$ |
| Linear | Force | Any | Yes | $y = ax$ |
| Linear | Include | None, 1/x, $1/x^2$, 1/y, $1/y^2$ | Yes | $y = ax + b$ |
| Linear | Include | Log | No – 1 | |
| Quadratic | Ignore | Any | Yes | $y = ax^2 + bx + c$ |
| Quadratic | Force | Any | Yes | $y = ax^2 + bx + c$ |
| Quadratic | Include | None, 1/x, $1/x^2$, 1/y, $1/y^2$ | Yes | $y = ax^2 + bx + c$ |
| Quadratic | Include | Log | No – 1 | |
| Power | Ignore | Any | Yes | $y = ax^b$ |
| Power | Force | Any | Yes | $y = ax^b$ |
| Power | Include | Any | No – 3 | |
| First-Order Log | Ignore | Any | Yes | $y = a\ln(x) + b$ |
| First-Order Log | Force | Any | No – 2 | |
| First-Order Log | Include | Any | No – 2 | |

TABLE 1-continued

| Curve Fit EquationType | Origin Type | Weight Type | Valid Model | Curve Fit Equation |
|---|---|---|---|---|
| Second-Order Log | Ignore | Any | Yes | $\ln(y) = a \ln^2(x) + b \ln(x) + c$ |
| Second-Order Log | Force | Any | No − 2 | |
| Second-Order Log | Include | Any | No − 2 | |
| Average of Response Factors | Ignore | Any | Yes | y = ax |
| Average of Response Factors | Force | Any | Yes | y = ax |
| Average of Response Factors | Include | None, 1/x, $1/x^2$, 1/y, $1/y^2$ | Yes | y = ax |
| Average of Response Factors | Include | Log | No − 1 | |

According to one embodiment, an "outlier" point is removed from the original N data points that are generated by the mass spectroscopy system, and then a subsequent curve fit process is performed, e.g., one or more of the foregoing described curve fits are performed, by the computer code on the remaining N-1 data points. A first outlier data point is defined as having the largest fit residual in the original N calibration points. For example, point 220 shown in FIG. 2 has the largest fit residual of the data points shown in graph 200. According to a further embodiment, a second outlier point is removed leaving N-2 points from the original data points. A second outlier point is defined as having a maximum residual relative to the second curve fit. After removal of the second outlier point, a subsequent curve fit process is performed, e.g., one or more of the foregoing described curve fits are performed. According to yet a further embodiment, a third outlier point is removed leaving N-3 points from the original data points. A third outlier point is defined as having a maximum residual relative to the third curve fit. After removal of the third outlier point, a subsequent curve fit process is performed, e.g., one or more of the foregoing described curve fits are performed. In certain aspects, outlier removal from a set of data points may be limited by two conditions: i) up to three outlier points may be removed, and ii) at least two points are needed for a curve fit, however, it should be appreciated that more than 3 outlier points may be removed.

According to a further embodiment, the computer code is configured to calculate a number of fit metrics for each curve fit performed by the computer code. The fit metrics provide information for how well a curve fit matches or fits a set of data points, e.g., a goodness of fit measure. In certain aspects, for example, the computer code is configured to calculate the R.sup.2 metric, which is often referred to as the coefficient of determination. Other useful metrics might include a Standard Error of the Fit, a Maximum Percent Residual or other metric.

The $R^2$ metric is computed from the sum of the squares of the distances of the data points from the best-fit curve determined by nonlinear regression. This sum-of-squares value is called $SS_{reg}$, which is in units of the y-axis squared. To turn $R^2$ into a fraction, the results are normalized to the sum of the square of the distances of the data points from a horizontal line through the mean of all y values. This value is called $SS_{tot}$. If the curve fits the data well, $SS_{reg}$ will be much smaller than $SS_{tot}$. $R^2$ is calculated according to the equation $R^2=1.0-SS_{reg}/SS_{tot}$. The Standard Error of the Fit is a standard statistical measure that is well understood by those of skill in the art and will not be described in detail herein. The Maximum Percent Residual is a metric that provides a measure of the maximum relative deviation of the curve fit from the data points. The Maximum Percent Residual=100×Max Residual/$Y_{max\ residual\ index}$. The Max Residual=Max $(|Y_n-Y_n^{(fit)}|)$ where n=1 to $n=N-N_{outliers}$. $Y_n^{(fit)}=Y(X_n)$ is the curve fit function evaluated at the concentration of the nth data point. The maximum residual index is the index n of the calibration point with the largest residual $|Y_n-Y_n^{(fit)}|$.

According to one embodiment of the present invention, for a given set of data generated by the data generation system, the computer code is configured to determine some or all curve fits described above and to calculate one or more of metrics for each curve fit. In certain aspects, curve fit determinations and metric calculations are performed prior to a request from a user to view and use a curve fit. According to one embodiment, a user interface is provided that allows a user to view and use the data and the curve fits, e.g., subsequent to the generation of the curve fits. Generating the curve fits, for example, as data is generated provides that curve fit data may be displayed to the user relatively quickly as the user requests the curve fits be displayed or otherwise used.

According to one embodiment of the present invention, the curve fit program is configured to rapidly present curve fits selected by the user on the display of the computer system, since each curve fit with each curve fit option is calculated prior to the user selecting the curve fits. Additionally, the computer code is configured to prominently present the curve fit selected by the user that has the best curve fit (i.e., having the highest fit metric) to the given data currently in use by the user. Prominent presentation of the curve fit having the best fit may include presenting this curve fit as a different color, as the top sheet in a multi-sheet presentation, or presenting the title of this curve fit at the top of a list of curve fits selected by the user, etc.

According to one embodiment, the computer code is configured to calculate confidence intervals for each of the model parameters a, b, and c for each curve fit and present the confidence intervals for each curve fit selected by the user. As will be understood by those of skill in the art, not all model parameters are calculated for all curve fits.

Figure 3:
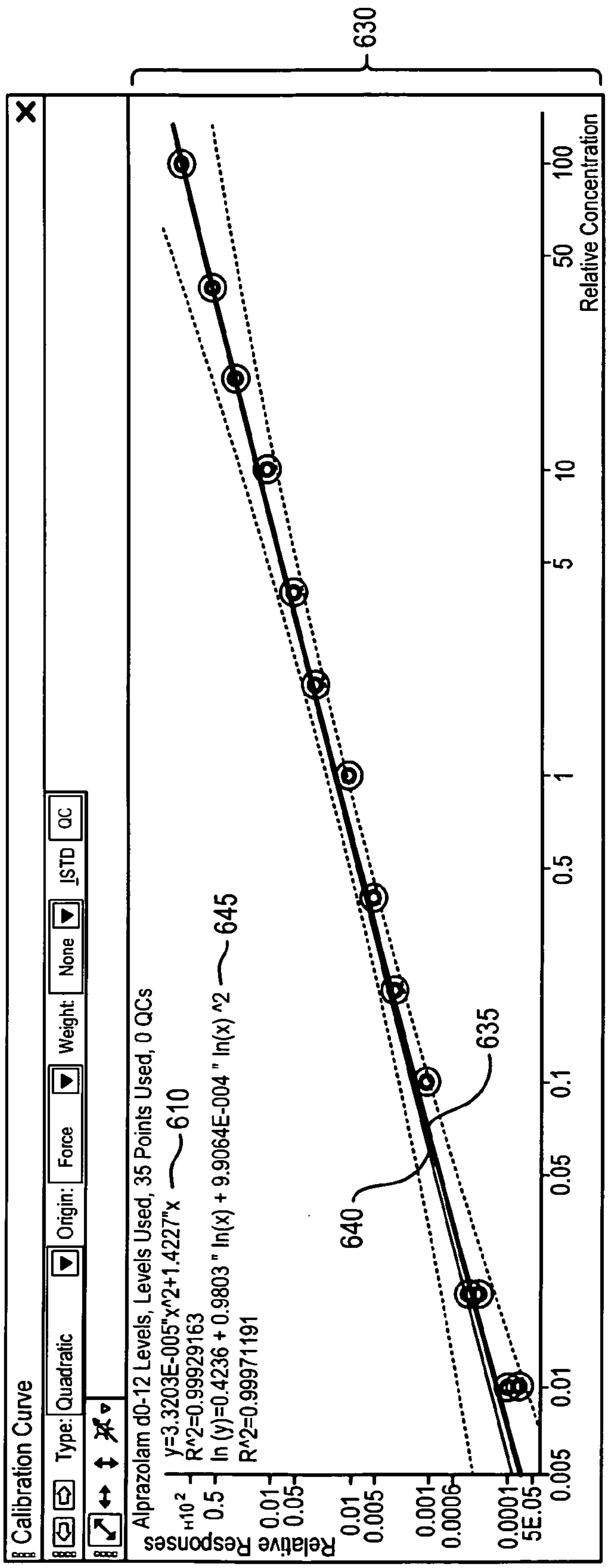
FIG. 3 is a simplified schematic of a user interface that might be displayed on a display of the computer system and is configured to permit the user to make selections of the curve fits the user would like to use and/or have displayed on the display.

FIG. 3 is a simplified schematic of a user interface 600 that might be displayed on a display of the computer system, and which permits the user to select the curve fit(s) the user would like to use and/or have displayed on the display. The interface display of FIG. 3 allows the user to compare the currently active curve fit with a selected suggested curve fit. The user interface may include a type drop down menu, an origin drop down menu, and a weight drop down menu as shown in the upper portion of FIG. 3. The displayed menu choices reflect the curve fit that is currently active, i.e., applied to the data and stored with the data set for future use. This (active) curve fit may be the result of a manual user selection via the drop-down menus, or it may be the result of a previous execution of the curve fit generation processes and an acceptance by the user of a selected curve fit from the curve fit table 620. The user interface is configured to display an equation 610 for the currently active curve fit type, origin, and weight. In the exemplary embodiment of FIG. 3, the quadratic curve fit option and the option for forcing the curve fit to pass through the origin are currently active. Equation 610 shows a quadratic curve fit. The $R^2$ metric (or other metric) may also be displayed for equation 610. Equation 610 and curve 635 correspond to the curve fit that is currently active and is stored with the data. Equation 645 and curve 640 correspond to the curve fit that is selected (e.g., highlighted) in the curve fit table 620.

According to the embodiment of FIG. 3, a set of suggested curve fits 620 are displayed on the user interface. The set of suggested curve fits are suggested to the user for display and/or for use. The suggested curve fits may be selected by the computer system based on one or more metrics, such as the $R^2$ metric. For example, each suggested curve fit may have a relatively high fit metric to the data set. The suggested curve fits may be ordered on the user interface according to the fit metrics. For example, the suggested curve fits may be displayed from top to bottom in a descending order of curve fit metrics with the suggested curve fit with the highest metric displayed at the top of the list of suggested curve fits. In certain aspects, the user may override the suggested "best fit" by selecting another row in the curve fit table 620. The selected curve fit is then displayed as curve 640 in window 630 along with the currently active curve fit 635.

A set of descriptors 625 for the suggested curve fits may be displayed on the user interface. For example, the equation type for each suggested curve fit may be displayed on the user interface, for example, in a first column 625*a*. According to the exemplary embodiment, the four suggested curve fits suggested to the user are for a second order ln fit, a power fit, a quadratic fit, and a linear fit. The manner in which the computer system handles the origin may be displayed on the user interface in a second column 625*b*. The weighting of each suggested curve fit may be displayed in a third column 625*c*. The number of outlier points that have been removed from the data set for the suggested curve fits may be displayed in a fourth column 625*d*. The fit metric (e.g., the $R^2$ metric) for each suggested curve fit may be displayed in a fifth column 625*e*. The curve fit having the highest fit metric (i.e., the curve that best fits the data) may be displayed at the top of the table that includes the suggested curve fits. The standard error of each suggested curve fit to the data may be displayed in a sixth column 625*f*. The maximum percent residual for each suggested curve fit may be displayed in a seventh column 625*g*. The equation for each suggested curve fit may be displayed in an eighth column 625*h*. Other descriptors for the suggested curve fits might additionally or alternatively be displayed on the user interface.

According to one embodiment, on a graph 630 of the data points, a currently active fit line 635 for equation 610 may be displayed. On graph 630, a fit line 640 for one of the suggested curve fits may also be displayed. The suggested curve fit that is selected for display is high-lighted in the curve fit table 620. In one aspect, by default, suggested curve fit 640 includes the highest suggested curve fit (i.e., the suggested curve fit having the "best fit" or the highest fit metric). In this case, the highest suggested curve fit is the second order ln curve fit that is displayed at the top of the suggested curve fits 620. An equation 645 may also be displayed for the highest suggested curve fit. The $R^2$ metric (or other metric) may also be displayed for equation 645. In one aspect, the user may override the default selected curve fit 640 by clicking on any row in the curve fit table 620. The curve fit selected by the user is highlighted in table 620 and the curve fit and equation displayed in the graph window 630 as curve 640 and equation 645.

Figure 4:
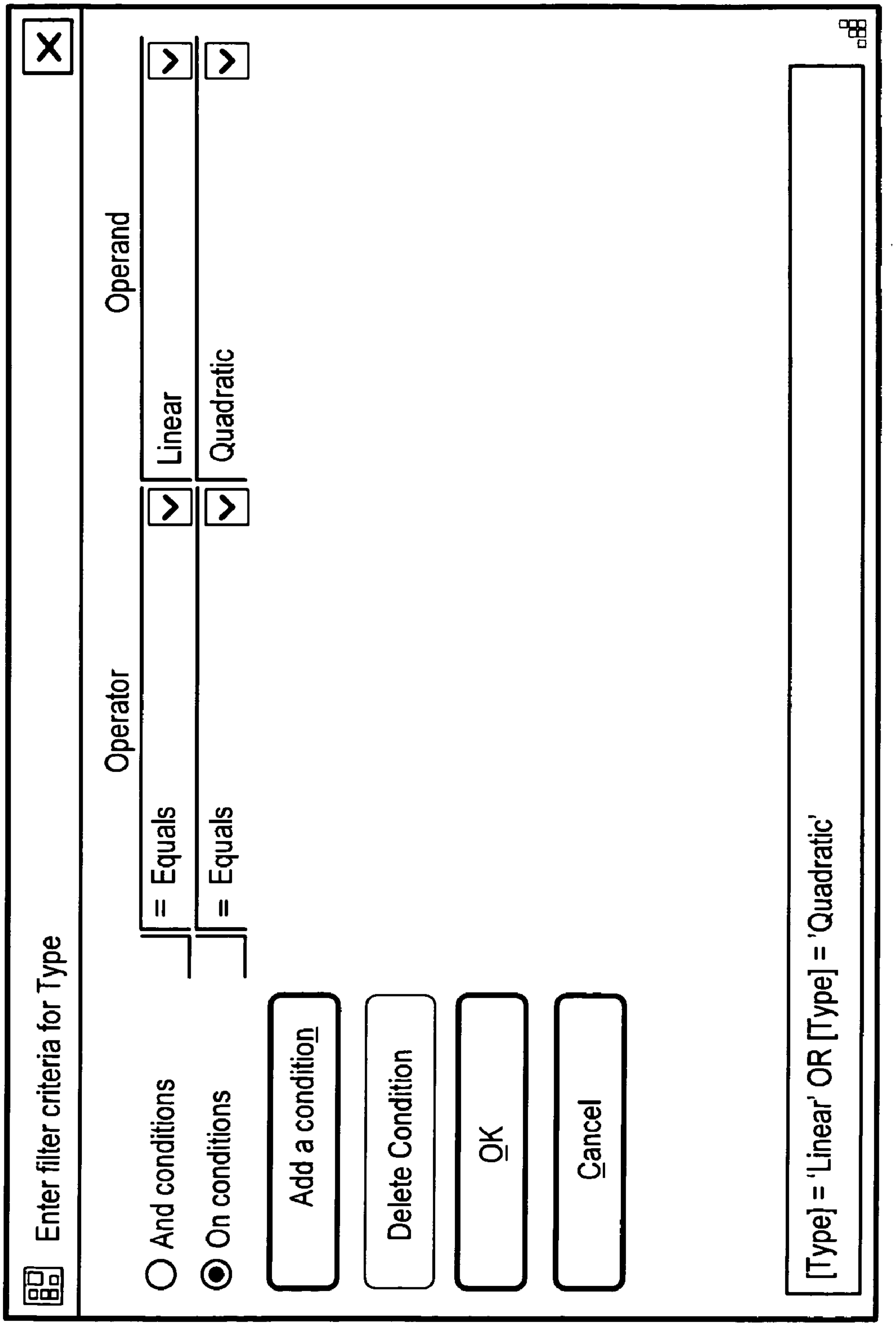
FIG. 4 illustrates a curve fit filtering dialog box according to an embodiment of the present invention.

According to one embodiment, the computer system (e.g., via the user interface) is configured to permit the user to filter the descriptors for the suggested curve fits, and thereby filter the suggested curve fits. One or more of the columns for the descriptors may include an icon 670 (e.g., a funnel) or the like that the user may select to filter the descriptors. For example, the icons may be configured to be selected by a mouse click (e.g., a right button mouse click) and a drop down menu, floating menu or the like may be displayed. Via these menus the user may request the computer system to filter the descriptors. For example, if the user right clicks on icon 670 for the number of disabled points, the user may be permitted to select the number of disabled (or outlier) points from any subset of the set {0, 1, 2, 3}. The computer system in response to the user's request to filter the descriptor may be configured to display a new set of suggested curve fits where the new set of suggested curve fits are for the subset of outlier numbers selected by the user. According to another example, if the user right clicks on icon 670 for the "type" of curve fit, the user may be permitted to select one or more curve fit types corresponding to any subset of the set {linear, quadratic, power law, first-order order log, second-order log, average of response factors}, as shown in FIG. 4. In response, the computer system displays a new set of suggested curve fits. The new set of suggested curve fits may include only those curve fit types that are allowed by the user-defined filter condition. FIG. 4 illustrates an example of filter conditions and logic for selecting one or more curve fit types. Each time a new set of suggested curve fits is displayed, the computer system displays a new curve fit 640 and a new equation 645 that are associated with the new (default) highest equation suggested curve fit. The user may override the displayed suggested curve fit 640 by selection of the curve fits in the curve fit table.

Figure 5:
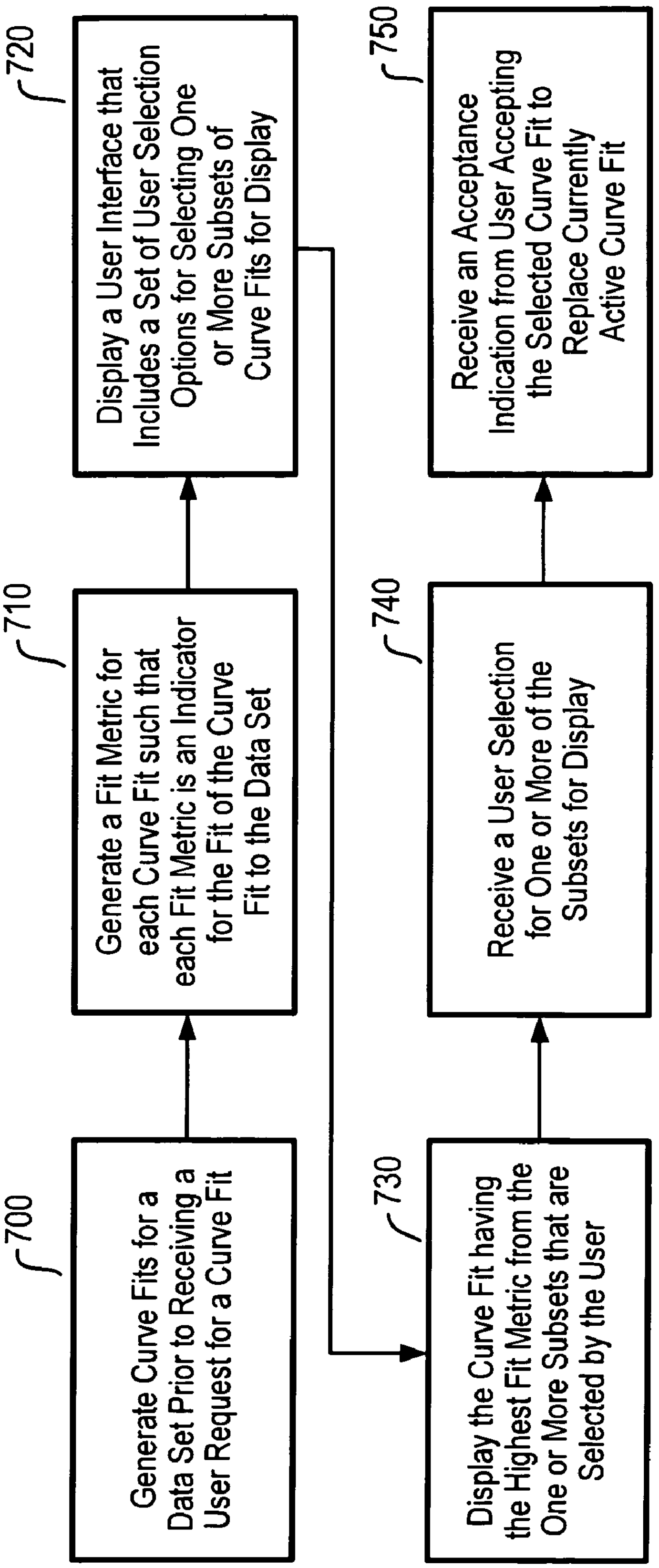
FIG. 5 is a high-level flow chart of a data analysis and data presentation method for a mass spectroscopy system according to one embodiment of the present invention.

FIG. 5 is a high-level flow chart of a data analysis and data presentation method for a mass spectroscopy system according to one embodiment of the present invention. The high-level flow chart is merely exemplary, and those of skill in the art will recognize various steps that might be added, deleted, and/or modified and are considered to be within the purview of the present invention. Therefore, the exemplary embodiment should not be viewed as limiting the invention as defined by the claims. At 700, a set of curve fits for a data set is generated. In one aspect, the curve fits are automatically generated prior to a user request for data being received from a user. The set of curve fits includes a plurality of subsets of curve fits and each subset of curve fits is associated with a curve fit equation. In one aspect, the curve fits include zero outliers removed, and in other aspects, at least one of the curve fits for each subset of curve fits has at least one outlier removed from the data set. At 710, for each curve fit, a fit metric is generated that indicates how well the curve fit matches the data set. At 720, a user interface is displayed that includes a set of user selections for selecting one or more of the subsets of (suggested) curve fits for display. In one aspect, the user selections are displayed as a table including selectable parameters such as the curve fit type, equation, equation parameters determined during curve fit generation, number of outliers removed, metric, etc. In one aspect, as a default, the curve fit having the best fit (highest fit metric) is displayed with the data set as a suggested curve fit at 730. At 740, a selection is received from a user for the display of at least one of the suggested curve fits. The user may also alter the subset parameters, such as the equation type, wherein a revised set of suggested curve fits are displayed based on the user selected parameters. At 750, upon user request, a selected curve fit is applied to the data set and becomes the currently active curve fit. The selected curve fit may be stored with the data. The user may then select other suggested curve fits from the curve fit table to be displayed along with the currently active curve fit.

It should be appreciated that the curve fitting processes, including the curve fitting and user interface rendering processes, may be implemented in computer code running on a processor of a computer system. The code includes instructions for controlling a processor to implement various aspects and steps of the curve fitting and display rendering processes. The code is typically stored on a hard disk, RAM or portable medium such as a CD, DVD, etc. Similarly, the processes may be implemented in a spectroscopy system or device, such as a mass spectrometer, including a processor executing instructions stored in a memory unit coupled to the processor. Code including such instructions may be downloaded to the mass spectrometer device memory unit over a network connection or direct connection to a code source or using a portable medium as is well known.

One skilled in the art should appreciate that aspects and embodiments of the data processing, curve fitting and interface rendering processes of the present invention can be coded using a variety of programming languages such as C, C++, C#, Fortran, VisualBasic, HTML or other markup language, Java, JavaScript, etc. and other languages.

It is to be understood that the exemplary embodiments described above are for illustrative purposes only and that various modifications or changes in light thereof will be suggested to persons skilled in the art and are to be included within the spirit and purview of this application and scope of the appended claims. Therefore, the above description should not be understood as limiting the scope of the invention as defined by the claims.

What is claimed is:

1. A computer-implemented method of processing data from a mass spectrometer system, the method comprising:
- processing a response data set representing response and concentration data for a set of samples processed by the mass spectrometer to produce a process result;
- automatically fitting the process result to a set of established statistical parameters to generate a plurality of suggested curve fits for the process result;
- displaying the plurality of suggested curve fits, enabling a user to select a suggested curve fit of the plurality of suggested curve fits for further processing; and
- displaying simultaneously a suggested curve fit line corresponding to the selected suggested curve fit and an active curve fit line corresponding to a currently active curve fit applied to the response data set, enabling a comparison between the suggested curve fit line and the currently active curve fit line.

2. The method of claim 1, further comprising:
- for each suggested curve fit, generating a fit metric parameter that indicates how well the suggested curve fit matches the data set,
- wherein said displaying the suggested curve fits includes displaying a user interface that includes a table with the suggested curve fits and associated parameters; and
- wherein a default suggested curve fit is displayed as the suggested curve fit line, the default curve fit having a highest fit metric for the suggested curve fits displayed in the table.

3. The method of claim 2, wherein the suggested curve fits are automatically generated prior to receiving a user request to view or process curve fits for the mass spectrometer-generated data.

4. The method of claim 2, wherein at least one of the suggested curve fits is weighted by a weighting factor included in a set of weighting factors, wherein the set of weighting factors includes 1, 1/x, $1/x^2$, 1/y, $1/y^2$, and log(x), wherein “x” represents a concentration or amount of material present in said samples; and wherein “y” represents a response of the mass spectrometer.

5. The method of claim 2, wherein the suggested curve fits include a curve fit that is forced through the origin.

6. The method of claim 2, wherein the suggested curve fits include curve fits generated using at least one of a linear equation, a quadratic equation, a power equation, a first-order log equation, a second-order log equation, and an average of response factors equation.

7. The method of claim 1, further comprising generating and displaying at least one parameter, including one or more of: equations useable for calculating suggested curve fits, a number of outliers removed from the data set, a weighting factor, and an origin handling parameter.

8. The method of claim 7, wherein:
- the equations include one or more of a linear equation, a quadratic equation, a power equation, a first-order log equation, a second-order log equation, and an average of response factors equation;
- the number of outliers removed from the data set includes zero, one, two, and three;
- the weighting factor includes one or more of 1, 1/x, $1/x^2$, 1/y, $1/y^2$, and log(x)); wherein “x” represents a concentration or amount of material present in said samples; and wherein “y” represents a response of the mass spectrometer; and
- the origin handling parameter includes a parameter indicating whether to force the curve fit through the origin, whether the curve fit includes the origin, and whether the curve fit ignores the origin.

9. The method of claim 2, wherein generating the fit metric includes generating one or more of an $R^2$ metric, a standard error of the fit metric, or a maximum percent residual metric.

10. A mass spectroscopy system comprising:
- a mass spectrometer configured to generate a response data set representing response versus concentration for a sample; and
- a computer system configured to:
  - process the response data set to produce a process result;
  - automatically fit the process result to at least two different sets of established statistical parameters to produce at least two suggested curve fits;
  - display the at least two suggested curve fits, enabling a user to select at least one of said at least two suggested curve fits for further processing; and
  - display a suggested curve fit line corresponding to the at least one selected suggested curve fit together with an active curve fit line corresponding to a currently active curve fit applied to the response data set, enabling a comparison between the suggested curve fit line and the currently active curve fit line.

11. The system of claim 10, wherein the computer system configured to process includes, for each suggested curve fit generated, generating a fit metric parameter that indicates how well the curve fit matches the data set, and
- wherein the computer system configured to display includes a configuration to display a user interface that includes a table with the at least two suggested curve fits, and
- wherein a default suggested curve fit is displayed as the suggested curve fit line, the default curve fit having a fit metric that indicates the best match to the data set for the suggested curve fits displayed in the table.

12. The system of claim 11, wherein an outlier has a maximum residual relative to its associated suggested curve fit.

13. The system of claim 11, wherein at least one of the suggested curve fits is weighted by a weighting factor included in a set of weighing factors, the set of weighting factors includes 1, 1/x, $1/x^2$, 1/y, $1/y^2$, and log(x)), wherein "x" represents a concentration or amount of material present in said samples; and wherein "y" represents a response of the mass spectrometer.

14. The system of claim 11, wherein the suggested curve fits include: a curve fit that is forced through the origin, a curve fit that includes the origin as a data point, and a curve fit that ignores the origin.

15. The system of claim 11, wherein the suggested curve fits include curve fits generated using at least one of a linear equation, a quadratic equation, a power equation, a first-order log equation, a second-order log equation, and an average of response factors equation.

16. The system of claim 10, wherein the computer system is further configured to produce and display at least one parameter including one or more of: equations useable for calculating suggested curve fits, a number of outliers removed from the data set, a weighting factor, and an origin handling parameter.

17. The system of claim 16, wherein:

the equations include one or more of a linear equation, a quadratic equation, a power equation, a first-order log equation, a second-order log equation, and an average of response factors equation;

the number of outliers removed from the data set includes one, two, and three;

the weighting factor includes one or more of 1, 1/x, 1/x2, 1/y, 1/y2, and log(x)); wherein "x" represents a concentration or amount of material present in said samples; and wherein "y" represents a response of the mass spectrometer; and the origin handling parameter includes a parameter indicating whether to force the curve fit through the origin, whether the curve fit includes the origin, and whether the curve fit ignores the origin.

18. The system of claim 11, wherein generating the fit metric includes generating one or more of an $R^2$ metric, a standard error of the fit metric, and a maximum percent residual metric.

19. A non-transitory computer-readable medium including code for controlling a processor to process data from a mass spectrometer system, the code including instructions to:

process a response data set representing response and concentration data for a sample processed by the mass spectrometer system to produce a process result;

automatically fit the process result to at least two different sets of established statistical parameters to produce at least two suggested curve fits;

display said at least two suggested curve fits, enabling a user to select one or more of said at least two suggested curve fits for further processing; and display simultaneously a suggested curve fit line corresponding to the selected suggested curve fit and an active curve fit line corresponding to a currently active curve fit applied to the response data set, enabling a comparison between the suggested curve fit line and the currently active curve fit line.

20. The computer-readable medium of claim 19, wherein the instructions to process include instructions to generate a fit metric for each suggested curve fit that indicates how well the suggested curve fit matches the data set; and wherein the instructions to display further include instructions to render a display of a user interface that includes a table with the suggested curve fits; and wherein a default suggested curve fit is displayed as the suggested curve fit line, the default curve fit having a highest fit metric for the suggested curve fits displayed in the table.

21. The computer-readable medium of claim 20, wherein the instructions to display further include instructions to process and display parameter selection options including:

equation selection options that include one or more of a linear equation, a quadratic equation, a power equation, a first-order log equation, a second-order log equation, and an average of response factors equation;

a selection option for the number of outliers removed from the data set that includes one, two, and three;

a selection option for the weighting factor that includes one or more of 1, 1/x, $1/x^2$, 1/y, $1/y^2$, and log(x)); wherein "x" represents a concentration or amount of material present in said samples; and wherein "y" represents a response of the mass spectrometer; and a selection option for origin handling that includes one or more of forcing the curve fit through the origin, the curve fit includes the origin, and the curve fit ignores the origin.

22. The method of claim 1, further comprising:

displaying a set of parameter descriptors for said suggested curve fits; and displaying an additional curve fit from the suggested curve fits responsive to a user selection of the additional curve fit.

23. The method of claim 22, further comprising:

receiving a user request to filter the set of suggested curve fits based on at least one of the descriptors; and displaying a new set of suggested curve fits based on the filter request.

24. The method of claim 23, wherein the set of descriptors includes a curve fit type, an origin selection type, a weight type, a number of outlier points, a fit metric, a standard error, and a maximum residual.

25. The method of claim 2, further comprising:

displaying an additional curve fit from the suggested curve fits displayed in the table responsive to a user selection of the additional curve fit.

* * * * *

UNITED STATES PATENT AND TRADEMARK OFFICE

CERTIFICATE OF CORRECTION

PATENT NO. : 8,078,427 B2
APPLICATION NO. : 11/465990
DATED : December 13, 2011
INVENTOR(S) : Marc Tischler et al.

It is certified that error appears in the above-identified patent and that said Letters Patent is hereby corrected as shown below:

In column 10, line 29, in Claim 8, delete “log(x));” and insert -- log(x); --, therefor.

In column 11, line 8, in Claim 13, delete “log(x)),” and insert -- log(x), --, therefor.

In column 11, lines 34-35, in Claim 17, delete “1/x2, 1/y, 1/y2,” and insert -- $1/x^2$, 1/y, $1/y^2$, --, therefor.

In column 11, line 35, in Claim 17, delete “log(x));” and insert -- log(x); --, therefor.

In column 12, line 29, in Claim 21, delete “log(x));” and insert -- log(x); --, therefor.

Signed and Sealed this
Sixth Day of March, 2012

David J. Kappos

David J. Kappos
*Director of the United States Patent and Trademark Office*